US007656317B2

(12) United States Patent
Salman et al.

(10) Patent No.: US 7,656,317 B2
(45) Date of Patent: Feb. 2, 2010

(54) REDUCED KEYPAD FOR MULTI-TAP INPUT

(75) Inventors: Majeed D. Salman, Redmond, WA (US); G. Eric Engstrom, Kirkland, WA (US)

(73) Assignee: Varia LLC, Seattle, WA (US)

( * ) Notice: Subject to any disclaimer, the term of this patent is extended or adjusted under 35 U.S.C. 154(b) by 628 days.

(21) Appl. No.: 11/547,827

(22) PCT Filed: Feb. 17, 2005

(86) PCT No.: PCT/US2005/005054

§ 371 (c)(1),
(2), (4) Date: Oct. 6, 2006

(87) PCT Pub. No.: WO2005/109645

PCT Pub. Date: Nov. 17, 2005

(65) Prior Publication Data

US 2007/0279256 A1 Dec. 6, 2007

Related U.S. Application Data

(60) Provisional application No. 60/565,638, filed on Apr. 27, 2004, provisional application No. 60/566,676, filed on Apr. 30, 2004, provisional application No. 60/567,214, filed on Apr. 30, 2004, provisional application No. 60/566,704, filed on Apr. 30, 2004.

(51) Int. Cl.
*H03M 11/00* (2006.01)
(52) U.S. Cl. .............. 341/23; 341/22; 379/355.07; 379/433.07; 379/433.04; 382/229; 715/811; 345/168

(58) Field of Classification Search ............... 341/20, 341/22; 345/168; 379/355.07, 433.07, 433.04; 382/229; 715/811
See application file for complete search history.

(56) References Cited

U.S. PATENT DOCUMENTS

| | | | | |
|---|---|---|---|---|
| 6,643,371 | B2 * | 11/2003 | Mager | 379/355.07 |
| 7,084,858 | B2 * | 8/2006 | Anson | 345/169 |
| 2002/0136372 | A1 | 9/2002 | Bozorgui-Nesbat | |
| 2006/0263137 | A1 * | 11/2006 | Griffin | 400/485 |

* cited by examiner

*Primary Examiner*—Albert K Wong
(74) *Attorney, Agent, or Firm*—Schwabe Williamson & Wyatt P.C.

(57) ABSTRACT

An apparatus (625) with a first plurality of input keys (635). Some of the first input keys may be associated with both a numeric value and a first set of alphabetic values and arranged in a first alphabetic keypad layout. The apparatus (625) is further provided with a second plurality of input keys (645), positioned adjacent to the first plurality of input keys (635), and being associated with at least one alphabetic value. Some of the input keys of the second plurality of input keys (645) may be arranged in a second alphabetic keypad layout different from the first alphabetic keypad layout. Further, in various embodiments, at least some input keys of the first plurality of input keys (635) have a second set of alphabetic values that is used as part of the second alphabetic keypad layout. Additionally, in various embodiments, at least some of the alphabetic values of the second keyboard layout are arranged at least partially based on a frequency of use of such alphabetic values.

8 Claims, 10 Drawing Sheets

REDUCED KEYPAD FOR MULTI-TAP INPUT

RELATED APPLICATIONS

This application claims the benefit of priority from Provisional Application Ser. No. 60/565,638 filed Apr. 27, 2004, Provisional Application Ser. No. 60/566,676 filed Apr. 30, 2004, Provisional Application Ser. No. 60/567,214 filed Apr. 30, 2004, and Provisional Application Ser. No. 60/566,704, filed Apr. 30, 2004, all of which applications are fully incorporated herein by reference.

TECHNICAL FIELD

The present disclosure is related to the field of electronic device user interfaces. More specifically, but not exclusively, the present disclosure relates to the design of input mechanisms for use in mobile electronic devices.

BACKGROUND INFORMATION

Mobile electronic devices have become ubiquitous in today's fast paced society. Various portable or mobile handheld devices can perform multiple tasks as well as provide multiple communication systems. For example, the personal digital assistant ("PDA") cellular telephone, in addition to serving as a personal organizer and cellular phone, may also provide text messaging, paging, and Internet connectivity. Providing a user-friendly interface, however, can be a challenge for manufacturers because of the limited surface area available on the usually handheld devices.

The traditional, non-portable computer desktop has generally utilized an input keyboard having a QWERTY keyboard layout, a keyboard layout that gained its name from the first six letters of the top row that spell "QWERTY". Most users are familiar with the QWERTY layout and many mobile electronic devices have a miniaturized QWERTY keyboard. Use of keys on a miniaturized QWERTY keyboard, however, can be difficult due to reduced key size and spacing.

Other mobile devices, such as a simple cellular telephone, may include only a conventional 12-key telephone keypad. Several methods have evolved for entering text on the telephone keypad, such as for example, multi-tap input or predictive text entry (e.g., T9 Text Input™ by America Online, Inc., of Dulles, Va.). Despite such methods, entering alphabetic characters via a typical 12-key telephone keypad may remain inefficient for users because the telephone keypad is not designed for text entry.

BRIEF DESCRIPTION OF THE DRAWINGS

FIG. 9 illustrates six exemplary non-English language keyboard layouts that may be implemented in a reduced manner in accordance with embodiments of the invention.

DETAILED DESCRIPTION

Figure 1:
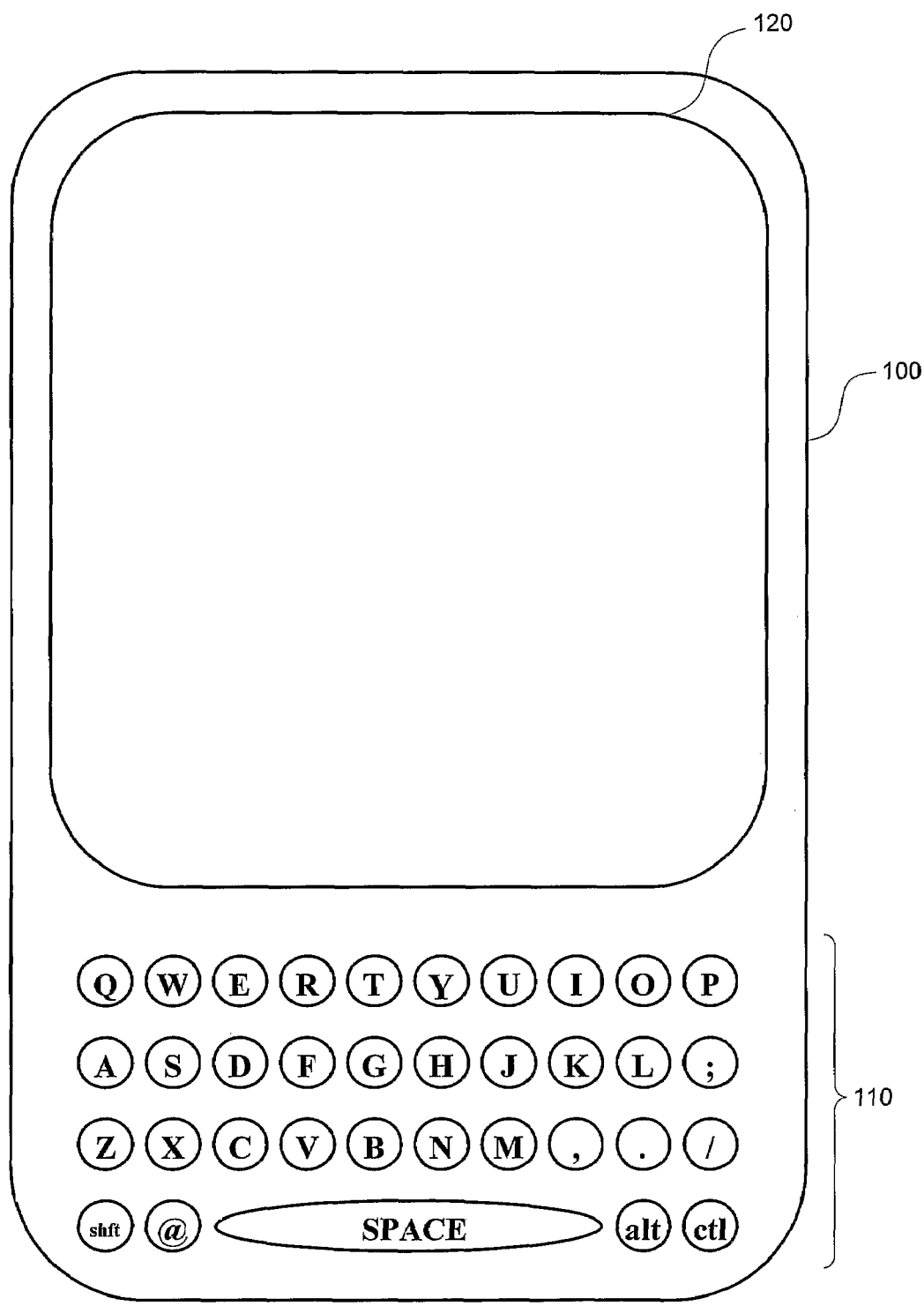
FIG. 1 illustrates a prior art, mobile electronic device including a miniaturized QWERTY keyboard for inputting data.

Embodiments of the present invention include, but are not limited to, a reduced keypad for a mobile electronic device and apparatuses including the same.

Parts of the description will be presented in terms such as portable or mobile electronic devices. As well understood by those skilled in the art, the term "portable/mobile electronic device" as used herein (hereafter, simply "electronic device"), including in the claims, comprise wireless mobile phones, PDAs, and the like.

The term "wireless mobile phone" as used herein refers to the class of telephone devices equipped to enable a user to make and receive calls wirelessly, notwithstanding the user's movement, as long as the user is within the communication reach of a service or base station of a wireless network service provider. Unless specifically excluded, the term "wireless mobile phone" is to include the analog subclass as well as the digital subclass (of all signaling protocols).

In the following description, various aspects of the illustrative embodiments will be described. It will be apparent, however, to those skilled in the art that alternate embodiments of the present invention may be practiced with all or only some aspects of the present invention. For purposes of explanation, specific numbers, materials and configurations are set forth in order to provide a thorough understanding of the described embodiments. However, it will be apparent to one skilled in the art that alternate embodiments of the present invention may be practiced without the specific details. In other instances, well-known features are omitted or simplified in order not to obscure the illustrative embodiments.

Various operations will be described as multiple discrete steps, in a manner that is most helpful in understanding the described embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

The embodiments are described herein with respect to a character set based on the English language. It is to be recognized that the invention may be practiced with characters of other languages as well.

"Activation" means an affirmative action by a user to provide a value associated with a key as input to the electronic device. Key activations may include a traditional mechanical key that, when pressed, causes the key to contact a switch on a circuit board located beneath the key. Alternatively, key activations may mean the touching by a user (or stylus) of a pressure sensitive key or a capacitive or resistive touch sensitive surface, as well as on "soft" keys on a touch-sensitive display.

While the present invention is described with respect to its improvement over a miniaturized "QWERTY" keyboard or a reduced QWERTY keyboard, one skilled in the art will recognize that the present invention may be practiced with respect to other keyboard layouts, such as a Dvorak keyboard and the like. Moreover, while the present invention is described with respect to an improvement over a miniaturized QWERTY keyboard, the present invention may be practiced with standard-sized keyboards in an attempt to enhance their functionality as well.

FIG. 1 illustrates an example prior art portable electronic device 100 utilizing a miniaturized QWERTY keyboard 110 for inputting data. Note that a relatively large display 120 leads to a reduced amount of surface area available for an input keyboard such as miniaturized QWERTY keyboard 110. In contrast to standard QWERTY keyboards in use with desktop and larger computers, miniaturized QWERTY keyboards on portable electronic devices typically have a limited key set. If the miniaturized QWERTY keyboard has numeric values, the values will frequently be located along the top row of keys, an arrangement often inefficient for user entry of telephone numbers. Furthermore, competing interface requirements on the keyboard have resulted in a reduction in input key size as well as a reduction in spacing between input keys. Frequently, users will activate input keys inadvertently due to the close proximity and size of the input keys. This affects the ability of a user to input data to electronic device 100.

Figure 2:
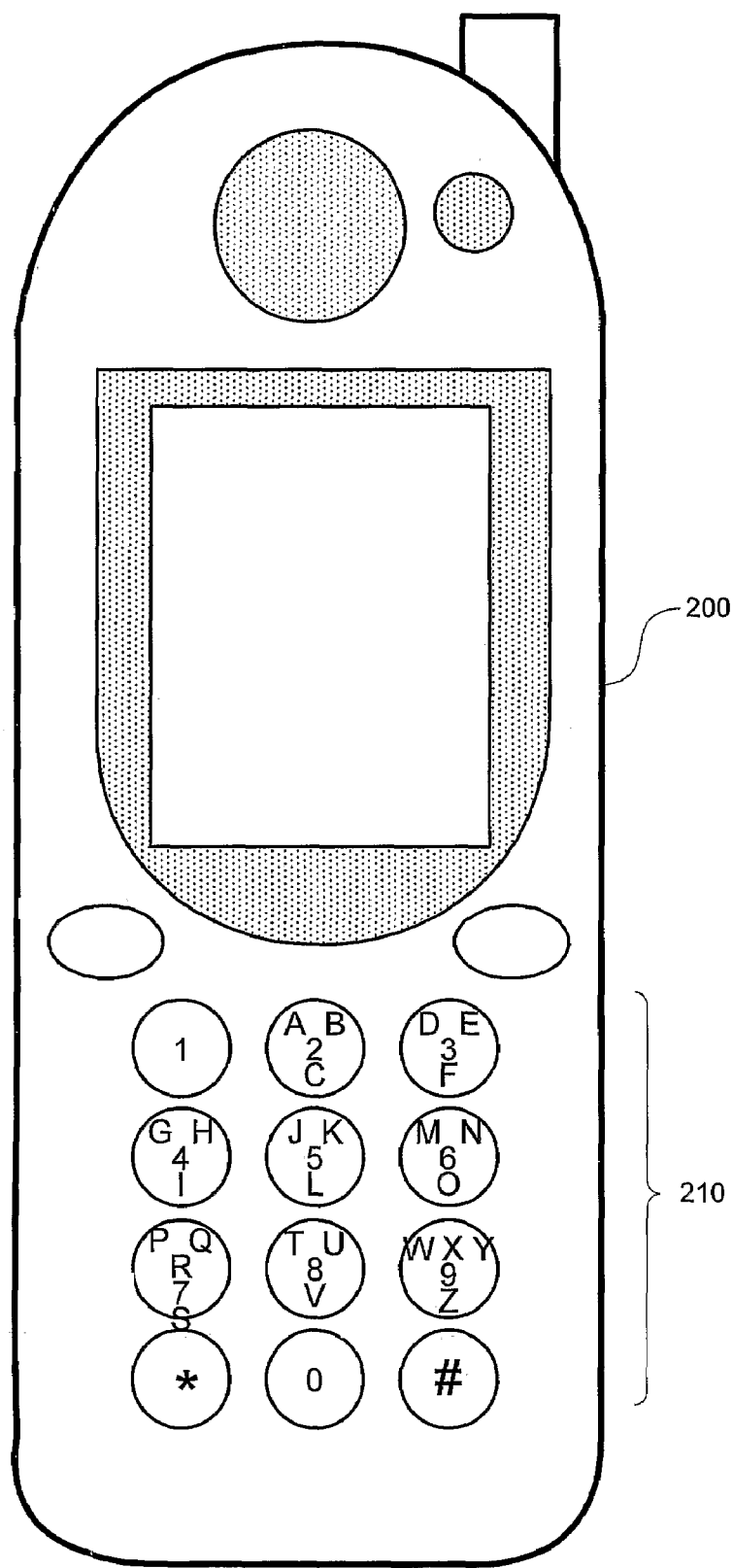
FIG. 2 illustrates a prior art, mobile telephone device including a conventional telephone keypad for inputting data.

Other mobile devices include simply a conventional telephone keypad. FIG. 2 shows an example prior art keypad 210 on a mobile telephone device 200. One method for entering alphabetic values via a telephone keypad 210 is generally known as multi-tap input. In order for a user to enter text using multi-tap input, an alphabetic value is selected by repeatedly activating a corresponding input key until the desired value appears. For example, a user may activate the input key associated with the numeric value "2" once for "a", twice for "b" or three times for "c." Thus, traditional multi-tap input requires multiple activations of a single input key in order to enter an alphabetic value.

Another method used for entering text on mobile telephone device 200 may include predictive text entry (T9 Text Input™). Using predictive text entry, a user activates each key only once to enter each alphabetic value of a key sequence representing a word. Software may then produce a list of word possibilities for the particular key sequence. If the desired word is correctly "predicted", the user then selects it from the list.

Figure 3:
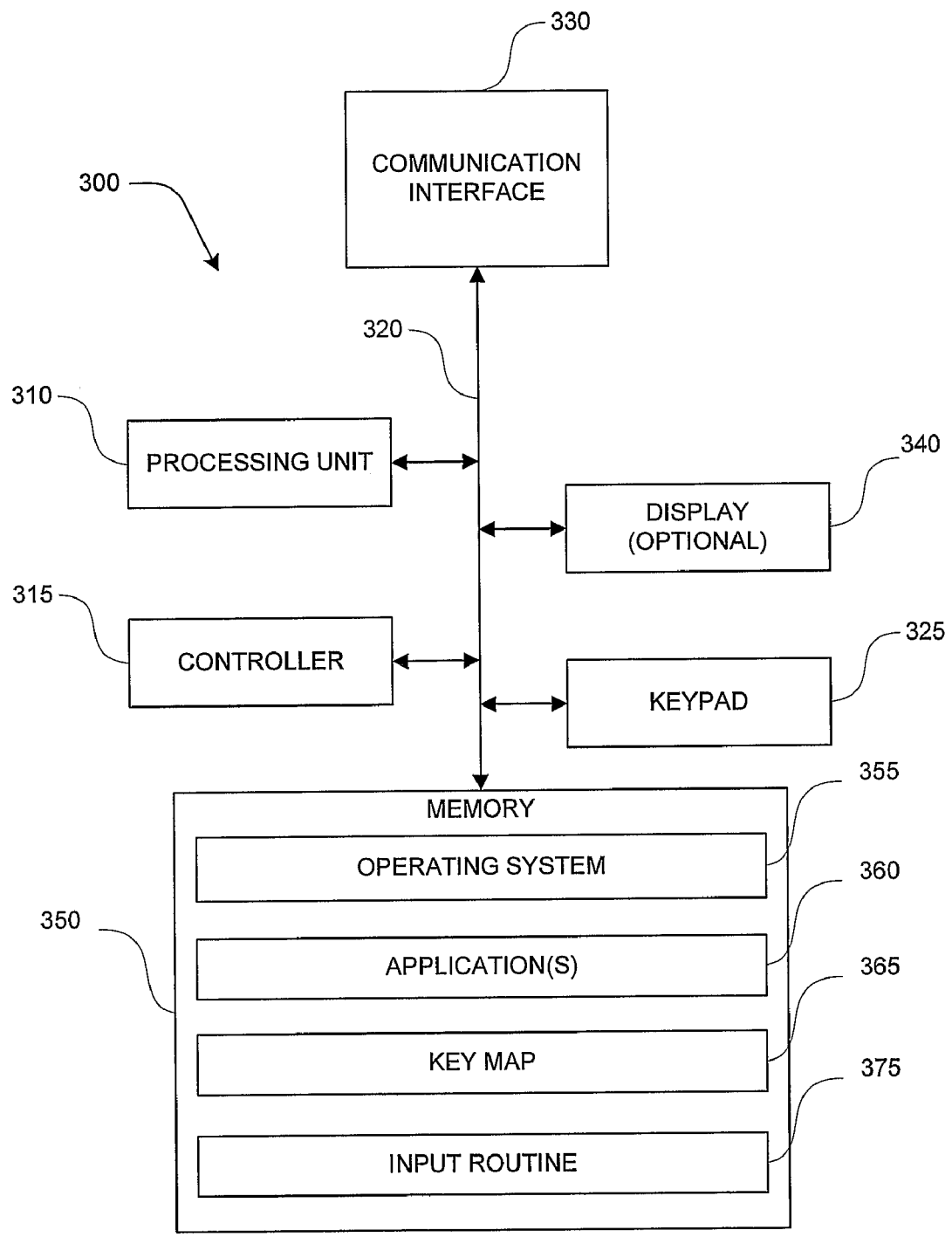
FIG. 3 illustrates a block diagram view of a computing environment, in accordance with an embodiment.

Referring now to FIG. 3, wherein an exemplary electronic device 300 suitable for use in embodiments of the present invention is shown. Those of ordinary skill in the art and others will appreciate that electronic device 300 may include many more components than those shown in FIG. 3. However, it is not necessary that all of these generally conventional components be shown in order to disclose an enabling embodiment for practicing the present invention. As shown in FIG. 3, electronic device 300 includes an optional communications interface 330 for connecting to remote device(s) (not shown). Communications interface 330 includes the necessary circuitry, driver and/or transceiver for such a connection and is constructed for use with the appropriate protocols for such a connection.

Electronic device 300 also includes a processor or processing unit 310, a controller 315, a reduced keypad 325, a display 340 and a memory 350, all interconnected along with the communications interface 330 via a bus 320. Memory 350 generally comprises random access memory ("RAM"), a read only memory ("ROM") and a permanent mass storage device, such as a disk drive, flash memory, or the like. Memory 350 stores an operating system 355, a key map 365, and an input method routine 375 formed in accordance with embodiments of the present invention. In an embodiment, input method routine 375 may include an input routine having a multi-tap input subroutine, a predictive text input subroutine, or both.

In various embodiments, memory 350 also stores application(s) 360. It will be appreciated by those of ordinary skill in the art and others, that while key map 365, input routine 375 and applications 360 are described as separate individual software components, they may actually be combined, comprised of multiple software components; or may in fact be sub-parts of one or more integrated software components. In particular, input routine 375 may be integrated with applications 360 or operating system 355. Additionally, while key map 365 and input routine 375 are illustrated as software components (e.g., part of the operating system, or a discrete application), in alternate embodiments, they may be hardware components of electronic device 300.

It will be appreciated that the software components may be loaded from a computer readable medium into memory 350 of the host computer or electronic device 300 using a drive mechanism (not shown) or network mechanism (not shown) associated with the computer readable medium, such as a floppy, tape, optical drive, flash memory, network interface card, or communications interface 330.

Further, communication interface 330 may be designed to support one or more signaling protocols, including but not limited to Code Division Multiple Access ("CDMA"), Time Division Multiple Access ("TDMA"), Global System for Mobile Communications ("GSM"), General Packet Radio Service ("GPRS") and so forth. Moreover, communication interface 330 may be implemented using a separate transmitter and receiver.

Electronic device 300 contains a reduced keypad 325 for providing input to electronic device 300. In accordance with the present invention, each input key on reduced keypad 325 may be associated with one or more values. A reduced keypad, in accordance with an embodiment, may have fewer keys than the limited keyboard shown in prior art QWERTY keyboard 110 and fewer keys than a standard QWERTY keyboard layout. Still, in an embodiment, the reduced keypads of the present invention may provide more data entry or input keys than the simple telephone keypads, such as conventional telephone keypad 210.

Figure 4:
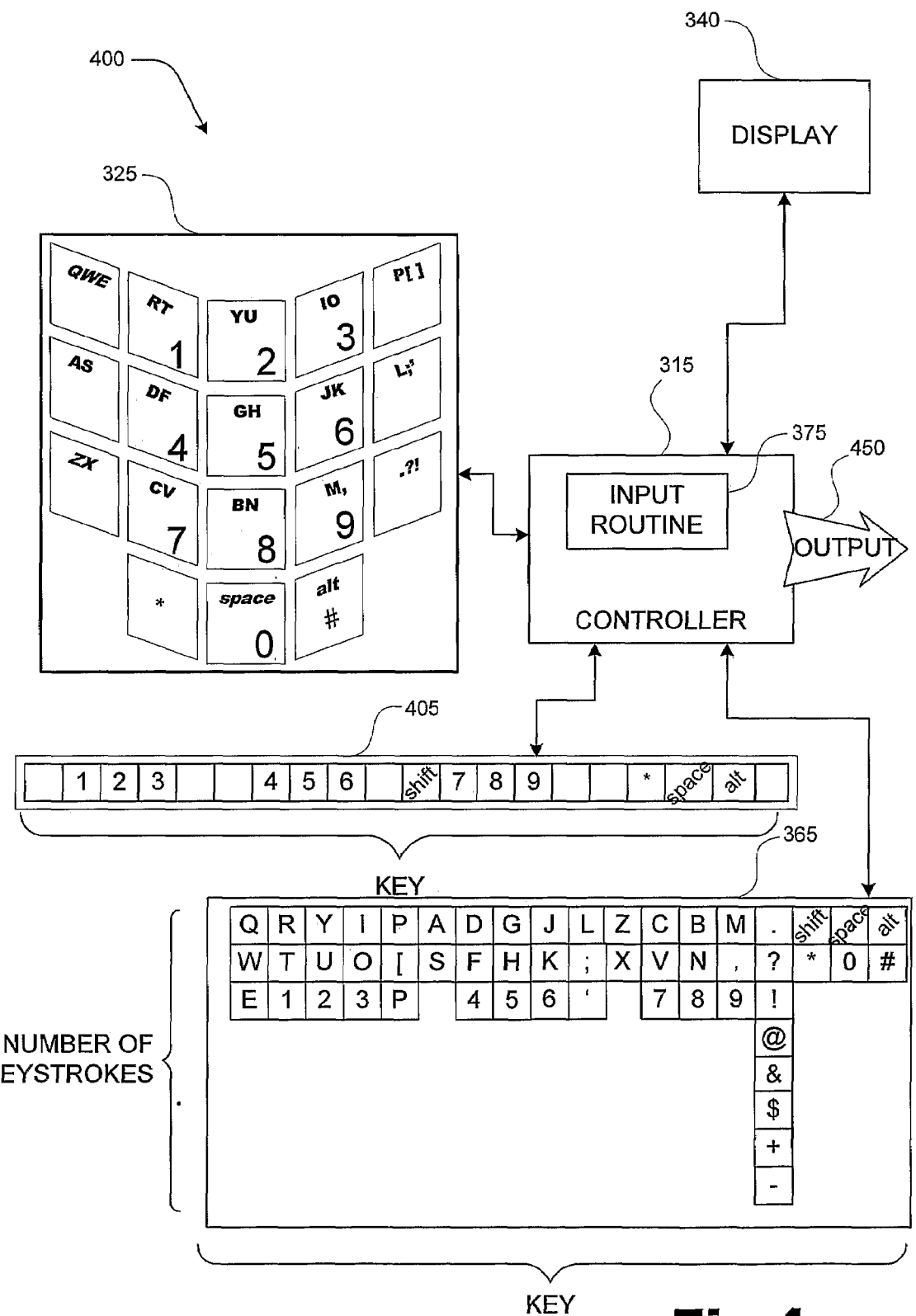
FIG. 4 illustrates a block diagram view of a keypad environment, in accordance with an embodiment.

FIG. 4 is a functional block diagram illustrating an input assembly 400 of an electronic device 300 corresponding to the reduced keypad of FIG. 3 in a "multi-tap" input mode. As alluded to earlier, for the illustrated embodiment, electronic device 300 is a wireless mobile phone; however, for other embodiments, electronic device 300 may be another electronic device, including but not limited to PDAs.

In FIG. 4, a controller 315 (either a hardware or software controller) operates in conjunction with an input routine 375 in support of keypad 325. Input routine 375 may have a multi-tap input subroutine (to be discussed in conjunction with FIG. 5). Input assembly 400 has an output 450 coupled to controller 315. As one example, when controller 315 is operating in multi-tap input mode, controller 315 detects each input key activation and an amount of time that has passed since the most recent input key activation, or the length of time between input key activations. A memory is coupled to controller 315 and stores a numeric key mapping 405 and an alphanumeric key mapping 365, which includes the assignments between the physical input keys, the number of times an input key is activated, and the corresponding characters. Controller 315 then provides an output signal to output 450, the output signal indicating the character selected by the user.

In one embodiment, successive selected characters are stored in a memory and become a generated text string.

In one embodiment, a display 340 is coupled to controller 315. In one embodiment, an output signal for controller 315 causes an appropriate alphabetic, numeric or non-numeric character to be displayed on display 340. In one embodiment, as the user repeatedly activates an input key and has not completed selection of a character, each successive activation causes a tentative character selection to overwrite the previous tentative character selection on display 340.

Figure 5:
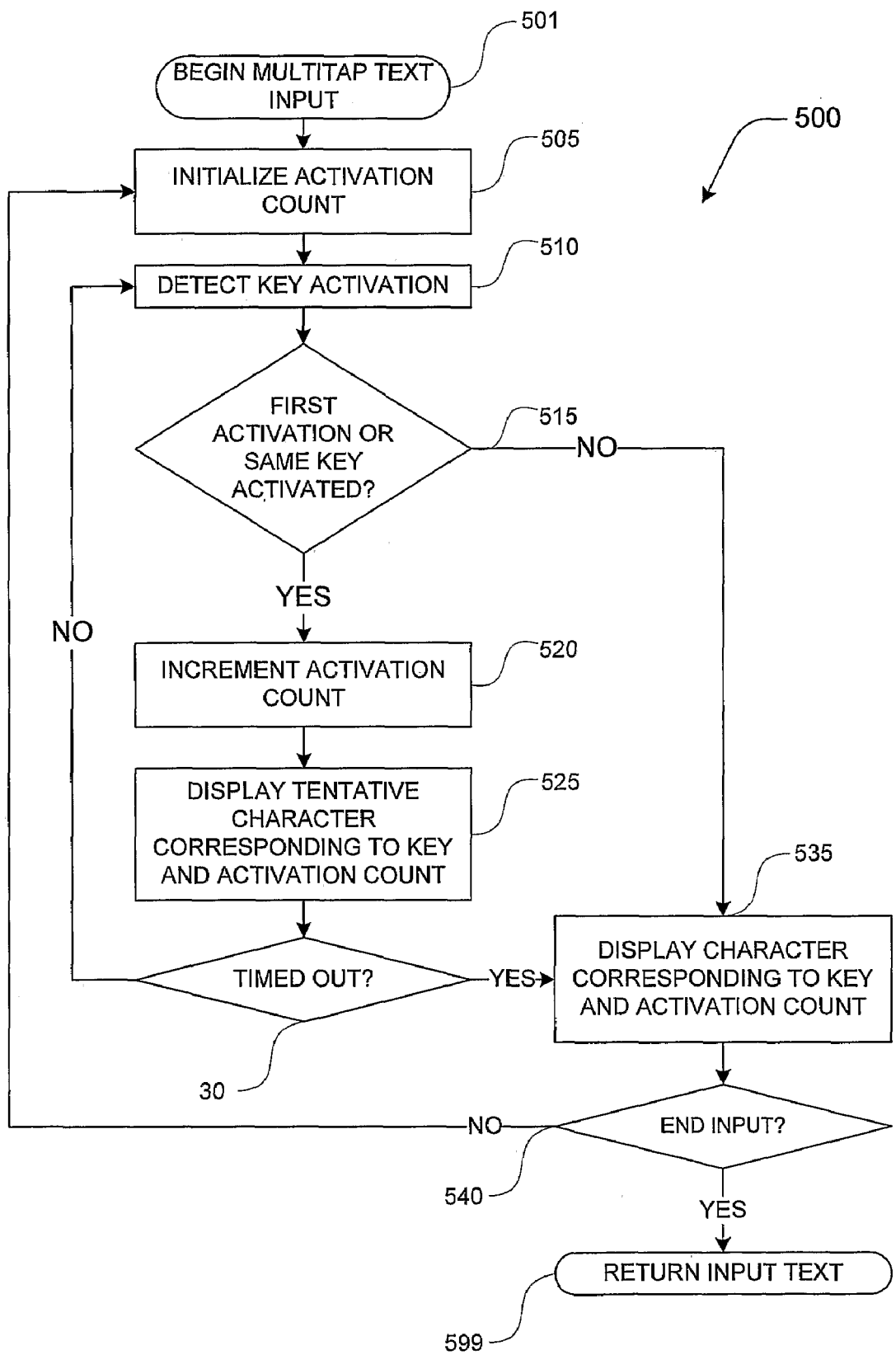
FIG. 5 illustrates a flow diagram of a multi-tap input subroutine, in accordance with an embodiment.

FIG. 5 illustrates an example process 500 associated with a multi-tap input subroutine of determining a selected character using multi-tap input. In the embodiment, "character" may refer to an alphabetic, numeric, non-alphabetic or non-numeric character or value. The process 500 starts at a box 501. At a step 505 an activation count corresponding to a current character selection is initialized to zero. At a step 510 the controller 315 detects an input key activation has occurred. The controller 315 saves an identifier designating the input key that has been activated. At decision block 515 a determination is made whether the activation is the first activation or a reactivation of the same input key, or whether the activation is of a new key after a previous activation of another input key. If the activation was the first activation or a reactivation of the same input key, then processing returns to step 520 where the controller 315 increments the activation count. Control flow proceeds to a step 525 where a tentative character corresponding to the combination of input key and activation count is displayed.

The character to display at step 525 is determined by using alphanumeric key map 365 or numeric key map 405 that associates each character with a corresponding unique combination of data input key and activation count. After displaying a tentative character at a step 525, a determination is made in decision block 530 whether a next input key activation is made prior to a predetermined timeout threshold elapsing between the prior key activation detection 510 and a next input key activation detection. If a period of time equal to or greater than the predetermined timeout threshold occurs, character selection is complete and flow proceeds to a step 535.

If a next input key activation is made prior to the timeout threshold occurring, however, flow control loops to step 510. The steps as described above then repeat. On second and subsequent passes through the sequence of steps 510-530, at the step 515 the determination of whether a different input key has been activated may be positive. If this is true, flow control moves to a step 535 where the character selection is complete. In this situation, after the step 535 and associated processing of the character selection are completed, the process 500 starts again for the new character selection 505 unless, in determination step 540, an end to the input is detected. In which case, processing ends at block 599 with a return of the input text to a calling routine.

The key activation detected at the step 510 for the new character is the different key that was detected at the step 515 for the processing of the previous character. The step 515 therefore allows only consecutive activations of an input key to be considered during the process 500 of determining a selected character. In one embodiment, the key detection at step 510 only proceeds as illustrated when the key detected is one of a limited set of data entry keys. At the step 525, the controller 515 accesses a key map in the memory with an indication of the input key activated by the user and the number of times the key has been activated, and determines from the key map a tentative character selected by the user. This tentative character is displayed. Upon reaching the completion of the character selection 535, the tentative character becomes the actual character selection. If the end of input is detected in determination block 540, the controller 315 provides an output signal to return input text 599, where the output signal indicates the input text selected by the user.

Figure 6:
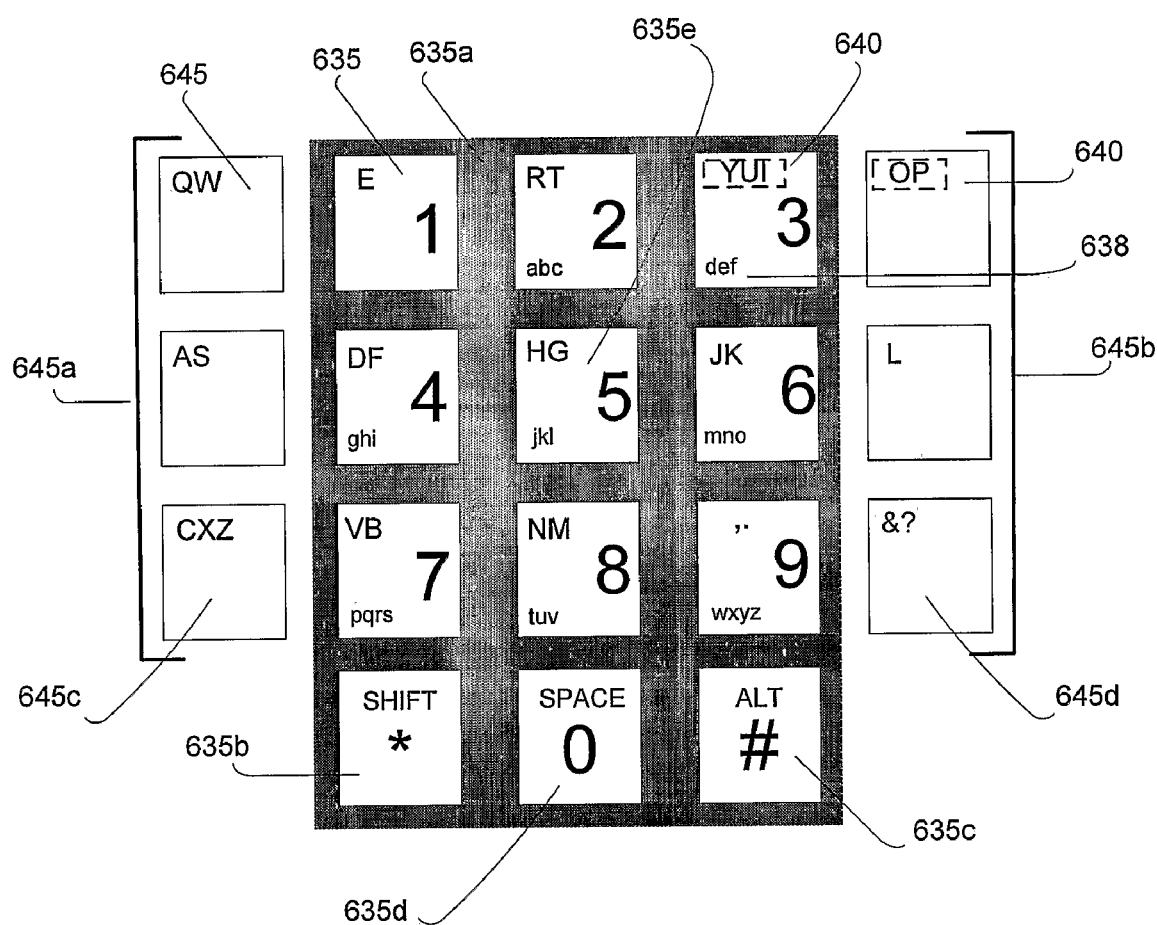
FIG. 6 illustrates an example of a reduced keypad in accordance with an embodiment.

FIG. 6 illustrates a top view of a reduced keypad 625 according to an embodiment. In the embodiment, reduced keypad 625 may enhance multi-tap input by placing more frequently used alphabetic values or letters in positions that require fewer activations than those of less frequently used letters. For a given language, for example, English, an arrangement of letters may be implemented by determining the frequency of use, sometimes referred to as the probability of occurrence, of each of the letters of the language. In one embodiment, the frequency of the use of each letter may be determined with respect to a corpus of usage representing general usage in a language. A table of probability of usage derived in this manner is included in "One-Gram Probability Distribution" from Alan G. Konheim's "Cryptography—A Primer," John Wiley, 1981, p. 16. This work cites the letters of the English alphabet as the following, in decreasing order of frequency of use: E, T, A, O, N, R, I, S, H, D, L, F, C, M, U, G, P, Y, W, B, V, K, X, J, Q, Z. In one embodiment, letters may be grouped in a manner compatible with standard keyboards or telephone keypads, and then some of the letters may be ordered on each input key in order of decreasing frequency of use. Thus, the present invention, as described, may advantageously make user entry of the more frequently used letters more convenient and efficient.

Thus, returning to the illustrated embodiment, reduced keypad 625 may be arranged in four rows and include a first plurality of input keys 635 (as included in shaded area 635a), partially surrounded on a left and a right side by a second plurality of input keys 645 (indicated by reference lines 645a and 645b). For the embodiment, at least some of first plurality of input keys 635 may be associated with a numeric value 0-9 and a first set of alphabetic values 638 to form a telephone keypad layout based on the first plurality of input keys' numeric values and respective first sets of alphabetic values 638. Each of the input keys of the first and second plurality of input keys 635 and 645 may be associated with one or more non-alphabetic or non-numeric values as well. Thus, as illustrated, the bottom row of first plurality of input keys 635 may also include input keys 635b and 635c associated with at least an asterisk and a pound symbol, respectively.

In the illustrated embodiment, at least some of first plurality of input keys 635 and second plurality of input keys 645 may be associated with a second set of alphabetic values 640, located on an upper portion of each input key. In contrast to each of first sets of alphabetic values 638, which may include one or more alphabetically ordered letters, each of second sets of alphabetic values 640 may include one or more letters arranged to be compatible with a modified or "Quasi-QWERTY" keyboard layout. Thus, in an embodiment, each of first plurality of input keys 635 may be arranged relative to each of adjacent or partially surrounding second plurality of input keys 645 to form a modified QWERTY keyboard layout wherein at least some of the alphabetic values are arranged at least partially based on a frequency of use of such alphabetic values. For example, each of input keys 635e and 645c have an alphabetic value arrangement on their respective keys that places alphabetic values with a higher frequency of use positioned before alphabetic values with a lower frequency of use based on a general corpus of usage in the English language. For example, input key 635e (the "5" key) may have an order "H G", rather than "G H", as would be the order according to a strictly QWERTY arrangement of alphabetical values. As another example, input key 645*c* may be associated with "CXZ" rather than "ZXC", as would likewise be the order on a strictly QWERTY keyboard layout.

Furthermore, in an embodiment, at least some alphabetic values of the second keyboard layout may be arranged relative to each other to provide a reduced set of possible digrams on a single input key. Digrams, also known as bigrams and digraphs, may represent commonly used pairs of letters in a language. For example, two common digrams in the English language are "ER" and "RE". Rather than grouping "E" and "R" on a single key, in the embodiment, the digram may be divided or "split" between adjacent keys of the keypad. Thus, in keypad 625, alphabetic value "E" may be found on the input key associated with numeric value "1" and alphabetic value "R" may be in a first position on a separate input key, the input key associated with numeric value "2."

Note that for clarity, only one input key 635, one input key 645, one set of first set of alphabetic values 638, and one set of second set of alphabetic values 640 have been labeled in the figure. Furthermore, please note that in the embodiment shown, although input keys 645 may include two groups of keys substantially disposed on a left and a right side of input keys 635, in alternate embodiments, second plurality of input keys 645 may be disposed at other suitable locations relative to first plurality of input keys 635 to facilitate the formation of the modified QWERTY keyboard layout or other suitable layout. In another embodiment, another suitable layout formed by first and second plurality of input keys 635 and 645 may include a modified Dvorak keyboard layout or other keyboard layout.

Additionally, as noted previously, in various embodiments, first plurality of input keys 635 or second plurality of input keys 645 may include one or more input keys associated with one or more non-alphabetic or non-numeric values. Examples of such associated values include but are not limited to, punctuation marks, special symbols or characters, device commands or other suitable values. In one embodiment, device command values may include function keys, cursor-control keys, or modifier keys. For example, as referenced above and shown in FIG. 6, input keys 635*b* and 635*c*, may include an asterisk or pound symbol on a lower portion of the respective keys. As illustrated, input keys 635*b* and 635*c* may also include modifier values "SHIFT" and "ALT", respectively. As another example, in the embodiment shown, first plurality of input keys 635 includes an input key 635*d* associated with device command value of 'space bar' as well as numeric value "0." Furthermore, in the embodiment shown, input key 645*d* of second plurality of input keys 645 may be associated with a symbol, "&" and a punctuation mark, "?".

Note also that although in FIG. 6, each of first and second sets of alphabetic values 638 and 640, the numeric values, and non-alphabetic and non-numeric values are displayed on particular portions of the input keys (i.e., upper, lower, central portions), in alternate embodiments, the values may be displayed on varying portions of the input keys. Also, note that in alternate embodiments, input keys of the first and second plurality of input keys 635 and 645 may be associated with more or fewer values and are not limited to the specific associated values as shown in FIG. 6. Furthermore, in one embodiment, input keys 635 and 645 may include input keys on a liquid crystal display (LCD).

In one embodiment, there may be a toggle button or an input key for activation of a QWERTY (or Quasi-QWERTY) mode or a telephone keypad mode. Thus, a user may input data using a Quasi-QWERTY layout for textual input and a telephone keypad for entry of telephone numbers and the like. As discussed previously, for a user to input data into electronic device 300, in an embodiment, reduced keypad 625 may be used with a multi-tap mode of entry. Thus, in one embodiment, a particular numeric value, an alphabetic value from first set 638, or an alphabetic value from second set 640 may be selectable based on a number of key activations applied to a corresponding input key. Thus, in one embodiment, a memory coupled to the input keys may have a key map 365 to map a combination of one or more key activations and an input key to a corresponding character or alphabetic value of first and second sets of alphabetic values 638 and 640.

Note that some electronic devices 300 may have one or more specific uses that vary the frequency of use of the alphabetic values. With these devices, a preferred order of alphabetic values or letters on each input key may vary according to the frequency of their usage and the teachings of the present invention. For example, in an embodiment, the frequency of use of each alphabetic value is determined with respect to a corpus of usage of portable electronic devices that do not have a complete alphanumeric keyboard, a complete alphanumeric keyboard being one that allows each alphabetic value to have an input key distinct from each other alphabetic value. The frequency of use of alphabetic values on such devices may vary from the frequency of use in the general language. For example, users of such devices often use abbreviations. They also use numbers to replace parts of words, such as using "SK8" in place of "SKATE". Thus, note that in variations of the embodiments illustrated in FIGS. 6-8, other ordered sets may be substituted for the ordered sets illustrated in these figures. Thus, in an embodiment, such ordered sets may depend upon a specific corpus of usage and various other factors. Note that in the embodiment shown, the remainder of second alphabetic sets 640 may comprise a substantially QWERTY keyboard layout (arrangement or ordering of alphabetic values) to maintain user familiarity with a location of alphabetic values on keypad 625.

Figure 6A:
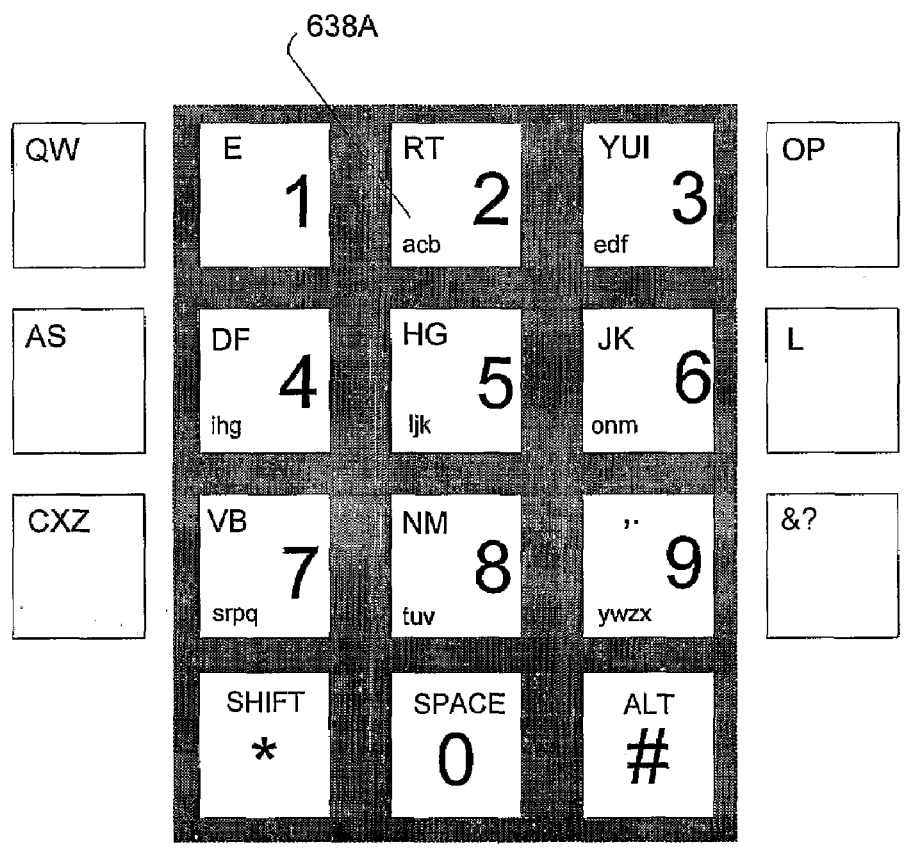
FIG. 6A illustrates an example of a further embodiment of the reduced keypad of FIG. 6.

FIG. 6A illustrates an alternative embodiment of keypad 625. In FIG. 6A, keypad 625A is an embodiment wherein first sets of alphabetic values 638A includes groups or sets of alphabetic values having an order on some input keys based on a frequency of occurrence of the alphabetic values, rather than alphabetically ordered as in first sets of alphabetic values 638 on keypad 625. A telephone keypad including such an arrangement is further described in U.S. Pat. No. 6,643,371 (hereinafter '371 patent), filed Aug. 31, 2001. For the embodiment, letter-to-key correspondence matches a standard letter-to-key correspondence as illustrated in FIG. 6, but within a group of alphabetic values, alphabetic values with a higher frequency of use may be positioned before alphabetic values with a lower frequency of use.

Thus, such an embodiment may be advantageous when using multi-tap entry for the same reasons that a modified QWERTY keyboard arrangement may be. Thus, the alphabetic values having a higher probability of occurrence may be selected by a single activation of the input key and alphabetic values with a lower probability of occurrence are selected by activating the input key two or more times. For example, as illustrated in FIG. 625A, the input key associated with numeric value "2" has an associated first set of alphabetic values 638A of "acb," rather an "abc." In the embodiment, a standard correspondence between numeric input keys and alphabetic values of the alphabet is maintained for compatibility when entering mnemonic phone numbers and generating DTMF signals.

Figure 7:
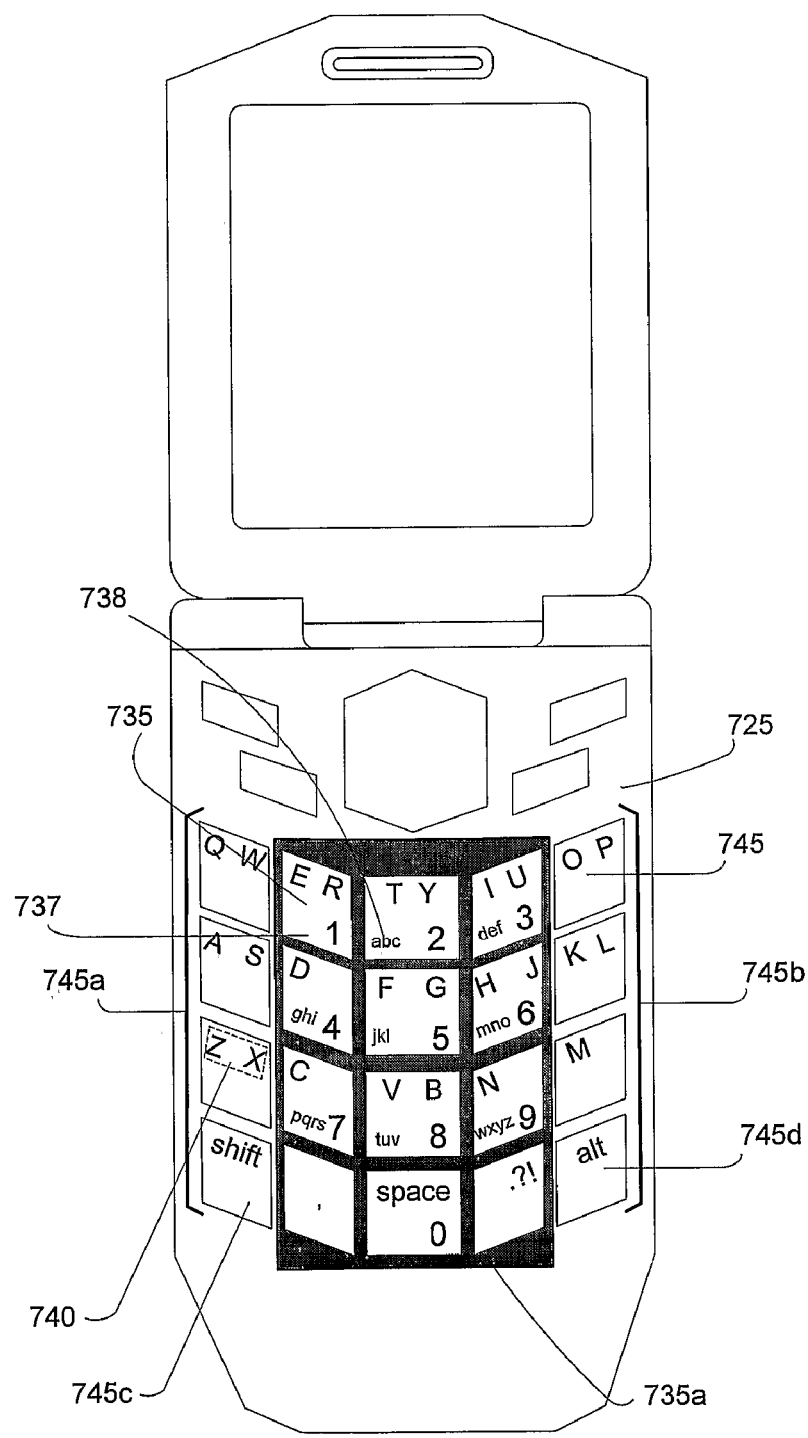
FIG. 7 illustrates a mobile electronic device having a reduced keypad in accordance with an embodiment.

Next, FIG. 7 illustrates an example electronic device 700 including a reduced keypad 725 according to one embodiment. In the illustrated embodiment, electronic device 700 may be a cellular phone. For the embodiment, electronic device 700 includes a first plurality of input keys 735 (as included in shaded area 735a), some of the first plurality of input keys 735 having displayed thereon a numeric character set 737. At least some of first plurality of input keys 735 also having displayed thereon a first alphabetic character set or first set of alphabetic values 738. Note that for the embodiment, each of first plurality of input keys 735 is arranged in a numeric and alphabetic telephone keypad layout.

Thus, in the illustrated embodiment, input keys of first plurality of input keys 735 having numeric values 2-9 may also have displayed thereon a first set of alphabetic values 738, having approximately three or four alphabetically ordered letters, in accordance with the embodiment. Thus, more specifically, in one embodiment, as illustrated in FIG. 7, the following ordered first set of alphabetic values 738 correspond to their respective numeric key: abc—2 key, def—3 key, ghi—4 key, jkl—5 key, mno—6 key, pqrs—7 key, tuv—8 key, wxyz—9 key. Thus, in an embodiment, correspondence between each of the numeric keys and alphabetically ordered letters of first set of alphabetic values 738 is substantially the same as the correspondence between each of the numeric keys and letters of a conventional telephone keypad.

Furthermore, in an embodiment, each of the alphabetically ordered letters of first set of alphabetic values 738 corresponds to a DTMF signal substantially consistent with a DTMF signal corresponding to the alphabetically ordered letters or values of a conventional telephone keypad layout. This may allow mnemonic phone numbers, such as 1-800-FLOWERS, and the like, to be entered in the same manner as on a conventional telephone keypad because the correspondence between each letter and numeric key is compatible.

In a similar manner to the keypads of FIGS. 6 and 6A, a second plurality of input keys 745 may be positioned adjacent to or partially surrounding first plurality of input keys 735. Second plurality of input keys 745 may include 2 groups of keys substantially disposed on a left and a right side of first plurality of input keys 735 as indicated by reference lines 745a and 745b, respectively. At least some of first plurality of input keys 735 and second plurality of input keys 745 may have displayed thereon a second alphabetic character set or second set of alphabetic values 740. In an embodiment, each of first plurality of input keys 735 may be arranged relative to each of partially surrounding second plurality of input keys 745 to form an alphabetic arrangement different from the alphabetic keyboard arrangement of a telephone keypad. In one embodiment, a modified QWERTY keyboard layout may be formed in conjunction with the first plurality of input keys 735. Note that input key 735b has displayed thereon "I U", rather than "U I" because "I" may be more frequently occurring than "U."

Note that for clarity in the figure, only one input key 735, one input key 745, one first set of alphabetic values 738, and one second set of alphabetic values 740 have been labeled. Further note that second plurality of input keys 745 includes an input key 745c associated with a value "SHIFT" and an input key 745d associated with a value "ALT". Thus, in one embodiment keypad 725 includes a total of 20 input keys, rather than 18 input keys as shown in keypad 625. Thus, as illustrated, electronic device 700 includes a mobile communication device or mobile electronic device. In one embodiment, the device may include a communication interface to facilitate communication with a communication station of a wireless network service provider Additionally, note that in the embodiment, reduced keypad 725 of FIG. 7 has been advantageously and ergonomically designed to arrange first and second pluralities of input keys 735 and 745 in a plurality of non-linear rows to form substantially a V-shape. The illustrated arrangement attempts to provide convenient access to the input keys by reducing strain on users' thumbs that may be caused by prior art keypad arrangements. When cradling electronic device 700 from the sides, the natural arcs of a user's thumbs create a "V" shaped region of movement. In one embodiment, an internal angle of the "V" shape of the input keys may be between sixty and one-hundred-and-seventy degrees.

Figure 8:
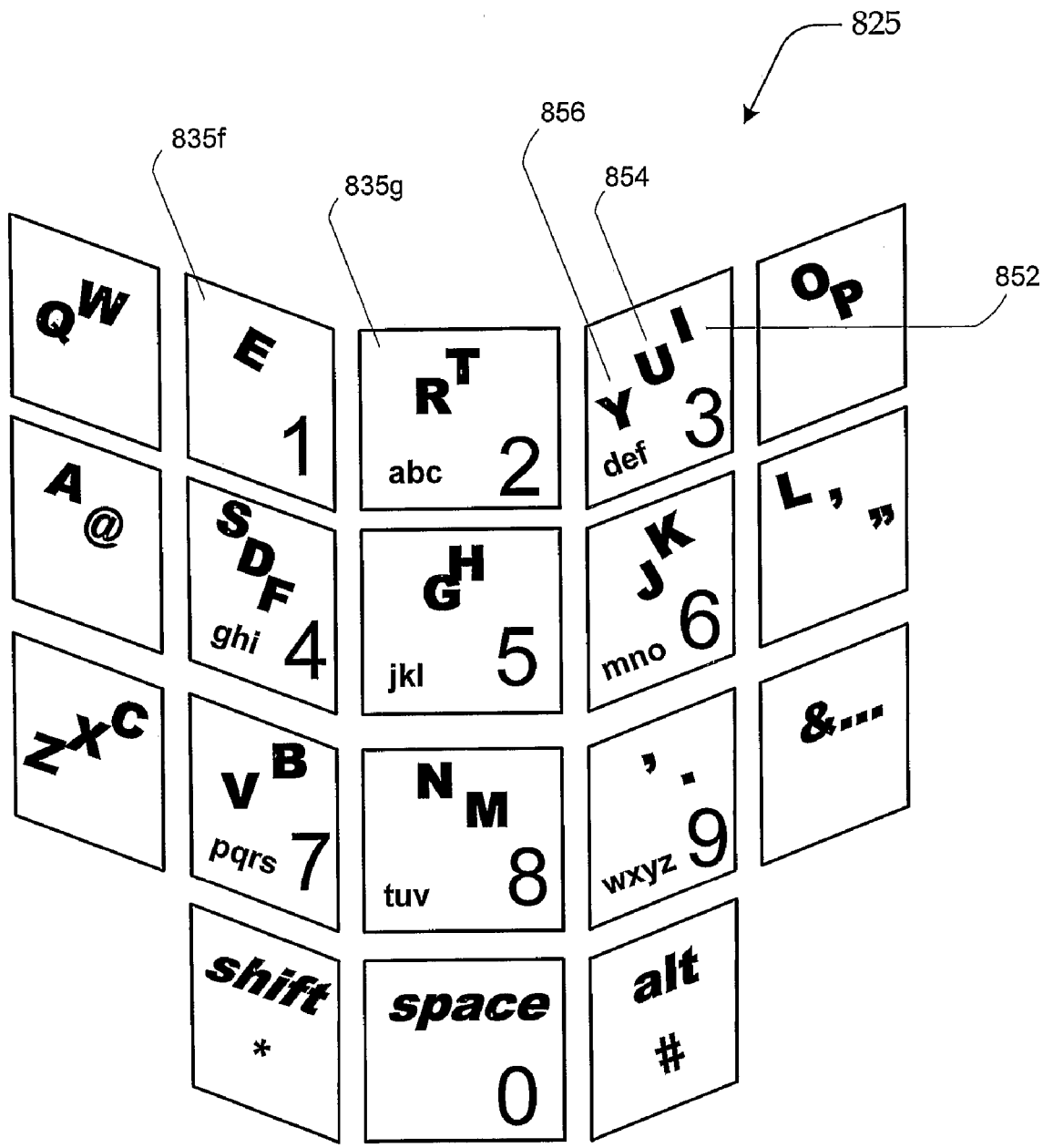
FIG. 8 illustrates an example of a reduced keypad in accordance with an embodiment.

FIG. 8 illustrates an alternative embodiment of a reduced keypad. In the illustrated embodiment, a reduced keypad 825 may be similar in many respects to previously illustrated keypads. Thus, keypad 825 may have a first plurality and a second plurality of input keys, some of the first plurality being associated with both a numeric value and a first set of alphabetic values and arranged in a telephone keypad layout. In the embodiment, a second plurality of input keys are positioned adjacent to the first plurality of input keys, and may be associated with at least one alphabetic value. At least some of the input keys of the second plurality of input keys may be arranged in a second alphabetic keypad layout, different from the first alphabetic keypad layout. Additionally, input keys of the first plurality of input keys may have a second set of alphabetic values that may be used as part of the second alphabetic keypad layout.

The second alphabetic keypad layout may have a QWERTY keyboard layout or other standard keyboard layout while allowing more frequently used alphabetic values or letters to be selected with fewer activations of a selected input key than less frequently used alphabetic values. Thus, in the embodiment, at least some of the input keys may have a first alphabetic value 852 positioned diagonally or vertically relative to a second alphabetic value 854, wherein first alphabetic value 852 may be more commonly or frequently used than second alphabetic value 854. Thus, in the embodiment, a single activation of a selected input key by a user may result in selection of first alphabetic value 852, while an additional activation results in selection of second alphabetic value 854.

Additionally, at least some of the input keys have a third alphabetic value 856, positioned diagonally or vertically relative to second alphabetic value 854, second alphabetic value 854 being more commonly used than third alphabetic value 856, and wherein a third activation of the respective input key results in a selection of third alphabetic value 856. Thus, for example, in the illustrated embodiment, "I" may be selected with a single activation of the input key associated with the numeric value 3, "U" with an additional activation and "Y" with a third activation. In one embodiment, processor or processing unit 310 may be coupled to keypad 825 to receive a signal indicating a selection of the alphabetic value. For clarity, only one first alphabetic value 852, one second alphabetic value 854, and one third alphabetic value 856, has been labeled in FIG. 8.

Note that in the embodiment, each of the input keys that have one, two or three alphabetic values positioned such that each of the first, second, or third alphabetic values 852, 854, and 856 may together form an alphabetic keyboard layout. In one embodiment, a standard alphabetic keyboard layout may be formed, such as a QWERTY keyboard layout, as shown. In another embodiment, a Dvorak keyboard layout may be formed. Thus, in one embodiment, a standard keyboard arrangement may be visually maintained while letters or values may be selected with fewer activations of a selected input key.

Furthermore, in the embodiment shown, at least some of the input keys are arranged in a manner so that digrams representing commonly used pairs of letters may be divided or "split" between adjacent keys of the keypad, as illustrated in FIG. 6. Thus, in the illustrated embodiment, input key 835*f* is associated with or represents a single letter "E", and is "split" from an adjacent letter "R" on input key 835*g*. Thus, in an embodiment a single activation of input key 835*f* may result in selection of the single letter, "E" and a single activation of input key 835*g* may result in selection of the single letter "R."

Figure 9:
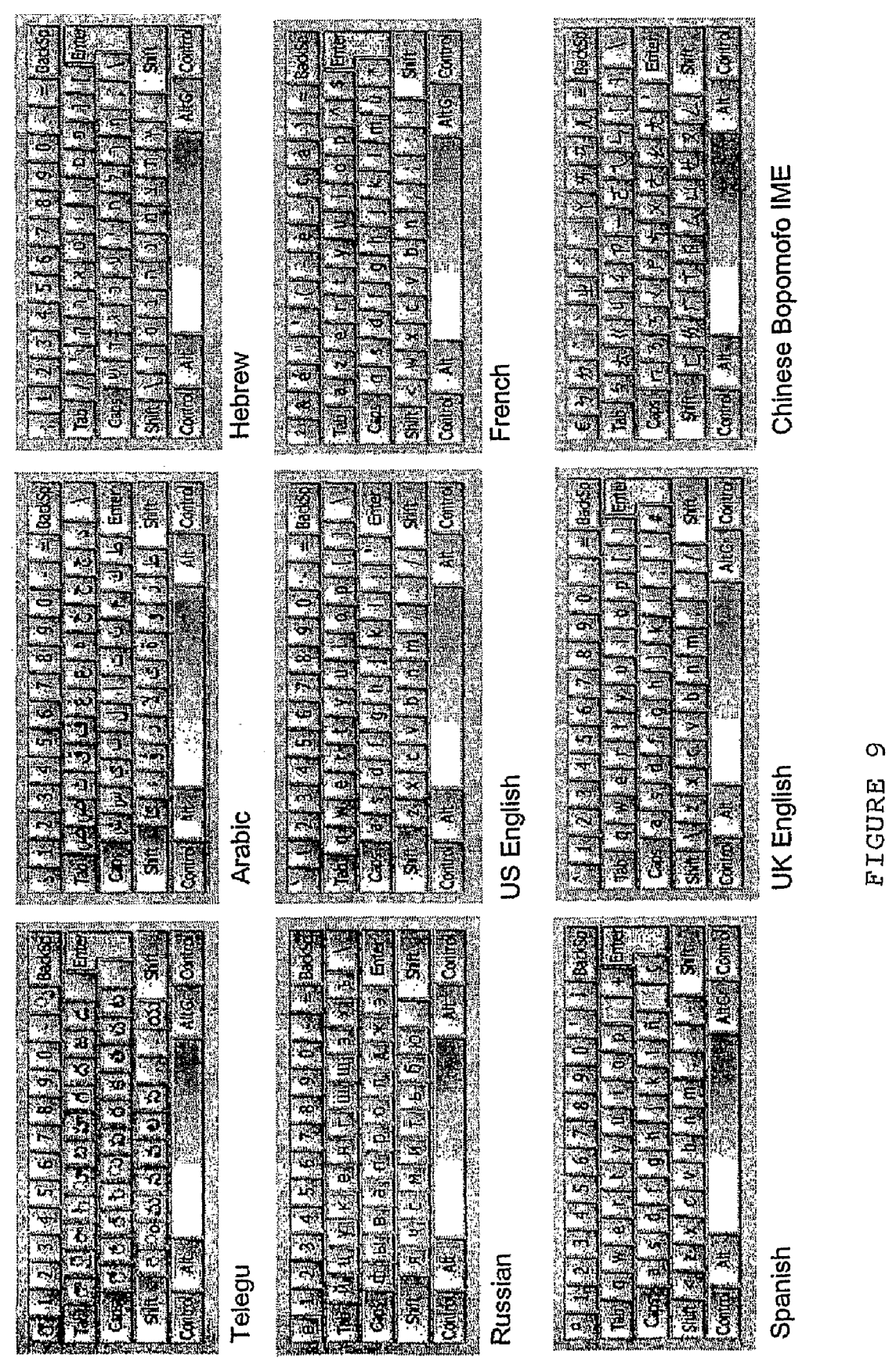

FIG. 9 illustrates six exemplary non-English language keyboard layouts that may be implemented in a reduced manner in accordance with embodiments of the invention. Illustrated from left to right and top to bottom, are keyboard layouts for the languages, Telegu, Hebrew, Russian, French, Spanish and Chinese. The present invention anticipates keypads that may be implemented from these and other similar keyboards in the reduced manner as earlier described for the English QWERTY keyboard or modified English QWERTY keyboard.

Thus, it can be seen from the above descriptions, a reduced keypad has been described for use on a mobile electronic device wherein at least some of the alphabetic values are arranged at least partially based on a frequency of use to enhance multi-tap input. In various embodiments, the reduced keypad may have a plurality of input keys arranged in substantially a V-shape. In one embodiment, there may be a toggle button or an input key for activation of a QWERTY mode (or "Quasi-QWERTY" mode) or a telephone keypad mode. Thus, a user may use a QWERTY layout for textual input and a telephone keypad for entry of telephone numbers and the like.

Those of ordinary skill in the art will appreciate that exemplary keypad 825, as well as the other exemplary keypads 425, 525, 625, 625A, and 725 are shown by way of illustration and are not meant to limit the scope of the present invention.

It will be appreciated that although particular embodiments of the invention has been described in detail, various modifications and improvements can be made by a person skilled in the art without departing from the scope of the present invention. It will also be appreciated that the frequency of use of letters varies in situations where users predominately use languages other than English, or where geographical or cultural differences result in different corpuses of use. In these situations, ordered sets other than those explicitly described, in accordance with the present invention, may be desirable.

What is claimed is:

1. An input apparatus, comprising:
a plurality of input keys, for entering alphabetic values and numerical values, divided into a first subset and a second subset wherein the second subset includes at least some of the input keys in the first subset and some of the input keys not in the first subset,
at least some of the input keys in the first subset being assigned both a numeric value and at least one alphabetic value wherein the alphabetic values are assigned according to a first keypad layout and wherein the input of numeric or alphabetic values is based on the number of consecutive key activations applied to a corresponding input key and
some of the input keys in the second subset being assigned at least one alphabetic value according to a different keypad layout wherein at least one of the input keys is assigned a plurality of alphabetic values that are input based on the number of consecutive activations applied to the input key and wherein the selection order is determined by a frequency of use of the alphabetic values assigned to the input key.

2. The apparatus of claim 1 wherein at least one input key in the first or second subset comprises a single alphabetic value.

3. The apparatus of claim 1 wherein at least two alphabetic values representing a commonly used pair of letters are arranged on adjacent input keys to provide a reduced set of possible digrams on a single input key.

4. The apparatus of claim 3 wherein the reduced set of possible digrams is at least partially based upon a corpus of usage representing general usage in a language.

5. The apparatus of claim 1 wherein the first and second subset of keys are arranged in a plurality of non-linear rows to form a substantially V-shape.

6. The apparatus of claim 1, wherein the input apparatus is a keyboard for use on a portable electronic device.

7. The apparatus of claim 1, wherein the input apparatus is a portable electronic device.

8. The apparatus of claim 1, wherein the input apparatus is a wireless mobile communication device, further comprising a wireless communication interface to facilitate wireless communication with a communication station of a wireless network service provider.

* * * * *

UNITED STATES PATENT AND TRADEMARK OFFICE
CERTIFICATE OF CORRECTION

| | |
|---|---|
| PATENT NO. | : 7,656,317 B2 |
| APPLICATION NO. | : 11/547827 |
| DATED | : February 2, 2010 |
| INVENTOR(S) | : Salman et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Thirtieth Day of November, 2010

David J. Kappos
*Director of the United States Patent and Trademark Office*